United States Patent
Zhao

(10) Patent No.: US 11,948,009 B2
(45) Date of Patent: Apr. 2, 2024

(54) METHOD AND DEVICE FOR OPERATING INSTANCE RESOURCES BASED ON INSTANCE ARRANGING PROPERTY

(71) Applicant: BOE TECHNOLOGY GROUP CO., LTD., Beijing (CN)

(72) Inventor: Junjie Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 528 days.

(21) Appl. No.: 16/476,362

(22) PCT Filed: Sep. 22, 2017

(86) PCT No.: PCT/CN2017/102983
§ 371 (c)(1),
(2) Date: Jul. 8, 2019

(87) PCT Pub. No.: WO2018/129956
PCT Pub. Date: Jul. 19, 2018

(65) Prior Publication Data
US 2021/0406076 A1    Dec. 30, 2021

(30) Foreign Application Priority Data

Jan. 13, 2017 (CN) .......................... 201710026213.5

(51) Int. Cl.
*G06F 9/46* (2006.01)
*G06F 9/455* (2018.01)
*G06F 9/50* (2006.01)

(52) U.S. Cl.
CPC ........ *G06F 9/5022* (2013.01); *G06F 9/45558* (2013.01); *G06F 9/5038* (2013.01);
(Continued)

(58) Field of Classification Search
CPC .. G06F 9/5022; G06F 9/45558; G06F 9/5038; G06F 9/5055; G06F 2009/4557; G06F 2009/45579
(Continued)

(56) References Cited

U.S. PATENT DOCUMENTS 8,560,805 B1 * 10/2013 Yakovlev ............ G06F 12/0223
711/100
2014/0351312 A1    11/2014 Lu et al.
(Continued)

FOREIGN PATENT DOCUMENTS

CN        103621113 A      3/2014
CN        103810338 A      5/2014
(Continued)

OTHER PUBLICATIONS

English Translation of KR-20180060620-A (Year: 2018).*
(Continued)

*Primary Examiner* — Bradley A Teets
(74) *Attorney, Agent, or Firm* — Collard & Roe, P.C.; William Collard

(57) ABSTRACT

A method and a device for operating instance resources are provided. The method includes receiving an operation request, acquiring an instance resource associated with the target resource according to an instance arranging property, executing the operation on the instance resource associated with the target resource, and transmitting an operation response. The operation request includes a type of an operation and a target resource.

15 Claims, 9 Drawing Sheets

(52) U.S. Cl.
CPC .... *G06F 9/5055* (2013.01); *G06F 2009/4557* (2013.01); *G06F 2009/45579* (2013.01)

(58) Field of Classification Search
USPC ........................................................ 718/104
See application file for complete search history.

(56) References Cited

U.S. PATENT DOCUMENTS

| | | | | |
|---|---|---|---|---|
| 2015/0033305 | A1* | 1/2015 | Shear | G06F 21/6218 726/6 |
| 2015/0163158 | A1* | 6/2015 | Ryland | H04L 41/0893 709/225 |
| 2016/0188367 | A1* | 6/2016 | Zeng | H04L 47/623 718/104 |
| 2016/0191295 | A1 | 6/2016 | Dong et al. | |
| 2016/0212732 | A1 | 7/2016 | Choi et al. | |
| 2017/0013063 | A1 | 1/2017 | Wang et al. | |
| 2017/0215072 | A1 | 7/2017 | Kim et al. | |
| 2018/0288098 | A1* | 10/2018 | Wang | G06F 16/27 |
| 2019/0075184 | A1* | 3/2019 | Seed, IV | H04L 67/2852 |

FOREIGN PATENT DOCUMENTS

| | | | | |
|---|---|---|---|---|
| CN | 104303454 | A | | 1/2015 |
| CN | 105612768 | A | | 5/2016 |
| CN | 106034112 | A | | 10/2016 |
| EP | 3115895 | A1 * | 1/2017 | ........... G06F 9/4881 |
| KR | 20180060620 | A * | 6/2018 | ............... G06F 9/50 |
| KR | 102214185 | B1 * | 2/2021 | ............... G06F 9/50 |
| WO | 2014/190053 | A1 | 11/2014 | |

OTHER PUBLICATIONS

English Translation of KR-102214185-B1 (Year: 2021).*
Qiuting Li et al., "Functional Architecture", TS-0001-FUNCTIONAL_ARCHITECTURE-V3_1_0.ZIP, ONEM2M, vol. work programme, Work Progr, No. version =v3.1.0 Dec. 23, 2016, pp. 1-432, XP084020206 Part one (pp. 1-108), (108 pages).
Qiuting Li et al., "Functional Architecture", TS-0001-FUNCTIONAL_ARCHITECTURE-V3_1_0.ZIP, ONEM2M, vol. work programme, Work Progr, No. version =v3.1.0 Dec. 23, 2016, pp. 1-432, XP084020206 Part two (pp. 109-216), (108 pages).
Qiuting Li et al., "Functional Architecture", TS-0001-FUNCTIONAL_ARCHITECTURE-V3_1_0.ZIP, ONEM2M, vol. work programme, Work Progr, No. version =v3.1.0 Dec. 23, 2016, pp. 1-432, XP084020206 Part three (pp. 217-432), (216 pages).
English translation of Extended European Search Report in EP Application No. 17891029.5 dated Jun. 29, 2020.
International Search Report of PCT/CN2017/102983 in Chinese, dated Dec. 20, 2017 with English translation.
Notice of Transmittal of the International Search Report of PCT/CN2017/102983 in Chinese, dated Dec. 20, 2017.
International Preliminary Report on Patentability and Written Opinion of the International Searching Authority of PCT/CN2017/102983, in Chinese, dated Jul. 16, 2019 with English translation.

* cited by examiner

METHOD AND DEVICE FOR OPERATING INSTANCE RESOURCES BASED ON INSTANCE ARRANGING PROPERTY

CROSS REFERENCE TO RELATED APPLICATIONS

This application is the National Stage of PCT/CN2017/102983 filed on Sep. 22, 2017, which claims priority under 35 U.S.C. §119 of Chinese Application No. 201710026213.5 filed on Jan. 13, 2017, the disclosure of which is incorporated by reference.

TECHNICAL FIELD

Embodiments of the present disclosure relate to a method and a device for operating instance resources.

BACKGROUND

With development of Internet of Things technologies, various application fields of the Internet of Things have been rapidly developed, and more and more terminals have been connected with the Internet of Things. A server-based terminal interactive mode has been widely used. For example, a plurality of terminals can register with a server, interact with each other through the server and/or interact with the server.

SUMMARY

Embodiments of the disclosure provide a method for operating instance resources, comprising: receiving an operation request, the operation request including a type of an operation and a target resource; acquiring an instance resource associated with the target resource according to an instance arranging property; executing the operation on the instance resource associated with the target resource; and transmitting an operation response.

For example, the operation request includes the instance arranging property; or the method further comprises: adding the instance arranging property in the target resource before receiving the operation request.

For example, the target resource includes a time series resource, a container resource, a flexContainer resource or a virtual resource.

For example, the instance arranging property includes an instance sorting property. The acquiring the instance resource associated with the target resource according to the instance arranging property, includes: acquiring an instance resource associated with the target resource according to the instance sorting property.

For example, the acquiring the instance resource associated with the target resource according to the instance sorting property, includes:
sequencing instance resources according to the instance sorting property;
acquiring the instance resource associated with the target resource from the sequenced instance resources.

For example, when the target resource is a virtual resource:
the acquiring the instance resource associated with the target resource from the sequenced instance resources includes: acquiring an instance resource pointed to by the virtual resource from the sequenced instance resources; and the executing the operation on the instance resource associated with the target resource, includes: executing the operation on the instance resource pointed to by the virtual resource.

For example, the instance arranging property includes an instance identifying property for identifying an instance resource to be requested. The acquiring the instance resource associated with the target resource according to the instance arranging property, includes: acquiring an instance resource pointed to by the instance identifying property as the instance resource associated with the target resource.

For example, when the target resource is a virtual resource, the acquiring the instance resource pointed to by the instance identifying property as the instance resource associated with the target resource, includes: acquiring the instance resource pointed to by the instance identifying property as an instance resource pointed to by the virtual resource.

For example, the instance resource includes an access control property, the access control property being used for determining an access control policy of an instance resource.

For example, the operation includes creating, acquiring, deleting, notifying and updating.

For example, the method further comprises: creating the target resource, the target resource including the instance arranging property.

Embodiments of the disclosure further provides a device for operating instance resources, comprising: a receiving unit, configured to receive an operation request, the operation request including a type of an operation and a target resource; an arranging unit, configured to acquire an instance resource associated with the target resource according to an instance arranging property; an operating unit, configured to execute the operation on the instance resource associated with the target resource; and a transmitting unit, configured to transmit an operation response.

For example, the operation request includes the instance arranging property; or the device further comprises a resource creating unit, configured to add the instance arranging property in the target resource before the receiving unit receives the operation request.

For example, the instance arranging property includes an instance sorting property. The arranging unit is configured to: acquire the instance resource associated with the target resource according to the instance sorting property.

For example, the arranging unit is further configured to:
sequence instance resources according to the instance sorting property;
acquire the instance resource associated with the target resource from the sequenced instance resources.

For example, when the target resource is a virtual resource:
the arranging unit is further configured to acquire an instance resource pointed to by the virtual resource from the sequenced instance resources; and
the operating unit is further configured to execute the operation on the instance resource pointed to by the virtual resource.

For example, the instance arranging property includes an instance identifying property, configured for identifying an instance resource to be requested; and the arranging unit is configured to: acquire an instance resource pointed to by the instance identifying property as the instance resource associated with the target resource.

For example, when the target resource is a virtual resource, the arranging unit is further configured to acquire an instance resource pointed to by the instance identifying property as the instance resource pointed to by the virtual resource.

For example, the instance resource includes an access control property, and the access control property is configured for determining an access control policy of the instance resource.

Embodiments of the disclosure further provide a method of requesting an operation on an instance resource, comprising:

transmitting an operation request, wherein the operation request includes a type of an operation, a target resource and an instance arranging property, and the instance arranging property includes at least one of an instance sorting property and an instance identifying property; and receiving an operation response, wherein the operation response is a response after executing the operation on an instance resource associated with the target resource, and the instance resource associated with the target resource is acquired according to the instance arranging property.

Embodiments of the disclosure further provides a requesting device, for operating an instance resource, comprising: a request transmitting unit, configured to transmit an operation request, wherein the operation request includes a type of an operation, a target resource and an instance arranging property, and the instance arranging property includes at least one of an instance sorting property and an instance identifying property; and a response receiving unit, configured to receive an operation response, wherein the operation response is a response after executing the operation on an instance resource associated with the target resource, and the instance resource associated with the target resource is acquired according to the instance arranging property.

BRIEF DESCRIPTION OF THE DRAWINGS

In order to illustrate the technical solutions in the embodiments of the present disclosure or the existing arts more clearly, the drawings needed to be used in the description of the embodiments or the existing arts will be briefly described in the following; it is obvious that the drawings described below are only related to some embodiments of the present disclosure, for one ordinary skilled person in the art, other drawings can be obtained according to these drawings without making other inventive work.

REFERENCE SIGNS

Figure 1:
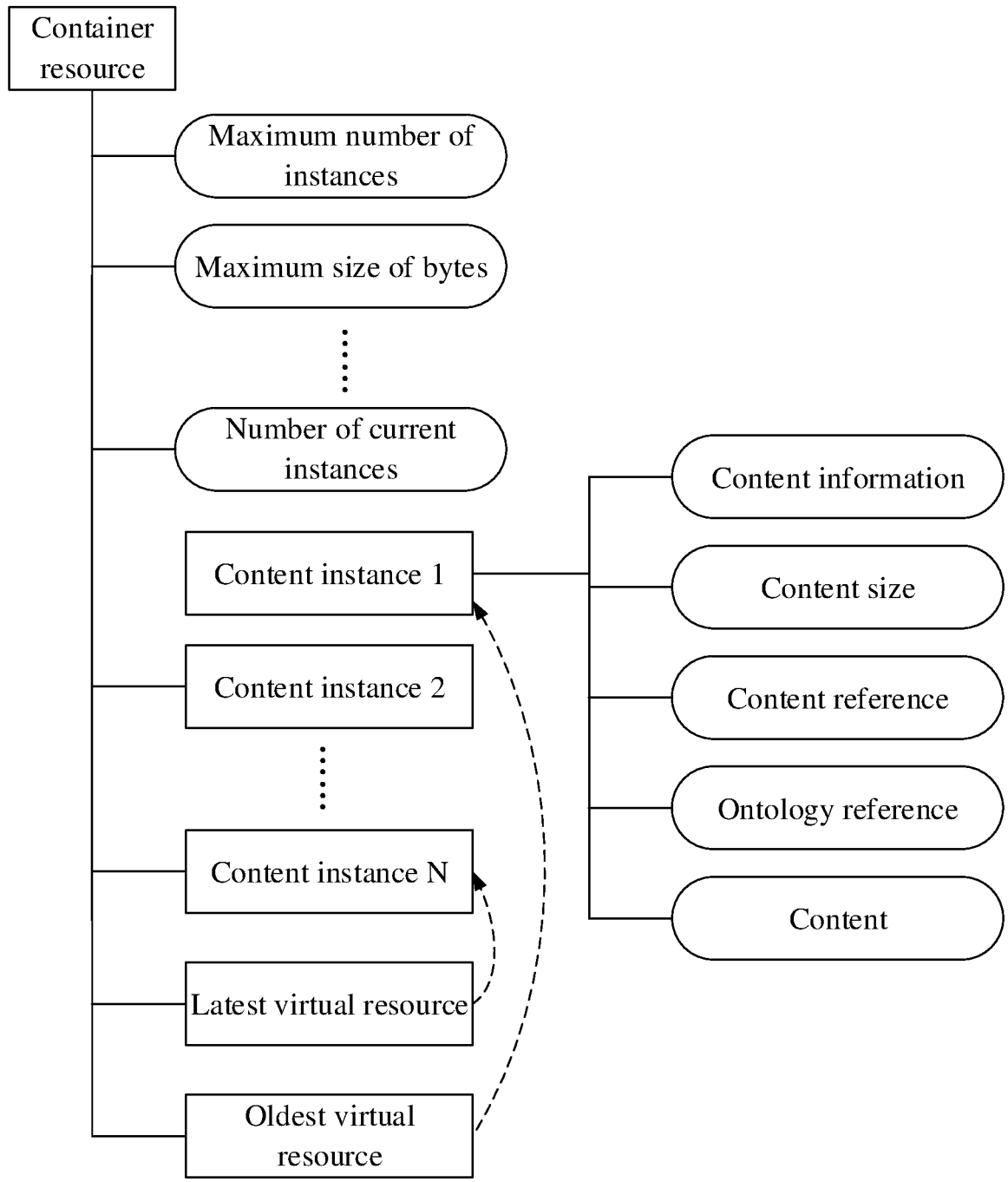
FIG. 1 is a schematic structural diagram of an example container resource.

Server application terminal 101, terminal 103, user terminal 106, server 150, processor 152, memory 154, device for operating instance resources 350, resource creating unit 352, receiving unit 354, arranging unit 356, operating unit 358, transmitting unit 360, instance arranging property 402, access control property 404, application entity 502, application entity 504, common service entity 506, and instance identifying property 602.

DETAILED DESCRIPTION

Hereafter, the purposes, the technical solutions and the advantages of the embodiments of the present disclosure will be described in a clearly and fully understandable way in connection with the drawings related to the embodiments of the disclosure. It is obvious that the described embodiments are just a part but not all of the embodiments of the present disclosure. Based on embodiments of the present disclosure, all other embodiments obtained by those skilled in the art without making other inventive work should be within the scope of the present disclosure.

For convenience of understanding, some terms involved in embodiments of the present disclosure are briefly described herein. It should be noted that, in scenarios without any ambiguity, meanings of the terms involved in embodiments of the present disclosure are not limited to the description herein, and may include the meanings well known to those skilled in the art.

In embodiments of the present disclosure, operations include actions such as creating, acquiring, deleting, notifying and/or updating and so on, which are not limited by the present disclosure herein. An operation request may be generated by a terminal for requesting a server to execute an operation; an operation response is a response generated by the server after the operation has been executed. For example, when an "operation" is to "create", an operation request is used for requesting a server to execute a "creating" operation; when the "creating" operation has been completed, the server may generate a response indicating completion of the corresponding "creating" operation.

In embodiments of the present disclosure, an application entity is located in an application layer for implementing a machine-to-machine (M2M) application service. For example, the application entity may include a remote blood sugar monitoring application, a power metering application, and/or a remote controlling application, etc. The application entity may be located in an M2M node, for example, in a client terminal or an application terminal.

A common service entity represents instantiation of a common service function in a M2M environment. For example, functions provided by the common service entity include: Data Management, Device Management, M2M Service Subscription Management, and/or Location Services, etc.

A container is used for sharing data instances between entities. For example, the container is an intermediate mediator of data exchange between an application entity and a common service entity. A content resource instance (also simply referred to as, content instance) represents a data instance of the container resource. A flexContainer is a template for defining a customizable container.

In some examples, after a server has received a registration request from a terminal device (also simply referred to as, terminal), the server registers the terminal device and creates a target resource for the terminal device, such as a container resource, for storing configuration and content information of the terminal device. For example, as shown in FIG. 1, a container resource (i.e., <container> resource) is created as a container of content information. When specific content is generated, a content instance (i.e., <container>/<contentInstance>) may be created under the container resource, for example, a content instance 1, a content instance 2, . . . a content instance N in FIG. 1. The container resource points to a content instance by establishing a virtual resource, and the virtual resource may include an oldest virtual resource (<oldest> resource) and a latest virtual resource (<latest> resource). For example, as shown by a dotted line with an arrow in FIG. 1, through configuration, the oldest virtual resource may point to the content instance 1 which has been created earliest, and the latest virtual resource may point to the content instance N which has been created latest. It is worth noting that a content instance is a type of instance resources under the container resource.

As shown in FIG. 1, in addition to creating the content instance resources, resource properties may be further created under the container resource, for example, a maximum number of instances, a maximum size of bytes, a number of current instances, a maximum instance age, a current size of bytes and the like. Each content instance resource may include content information, a content size, a content reference, an ontology reference, content and the like.

The container resource shown in FIG. 1 is only one type of a target resource, and a target resource may also be of other resource types, for example, a flexContainer resource and a time series resource. Structures of the flexContainer resource and the time series resource may be similar to those of the container resource. For example, resource properties of the flexContainer resource and instance resources of the flexContainer resource may be created under the flexContainer resource, and resource properties of the time series resource and instance resources of the time series resource (for example, time series instances) may be created under the time series resource.

Figure 5:
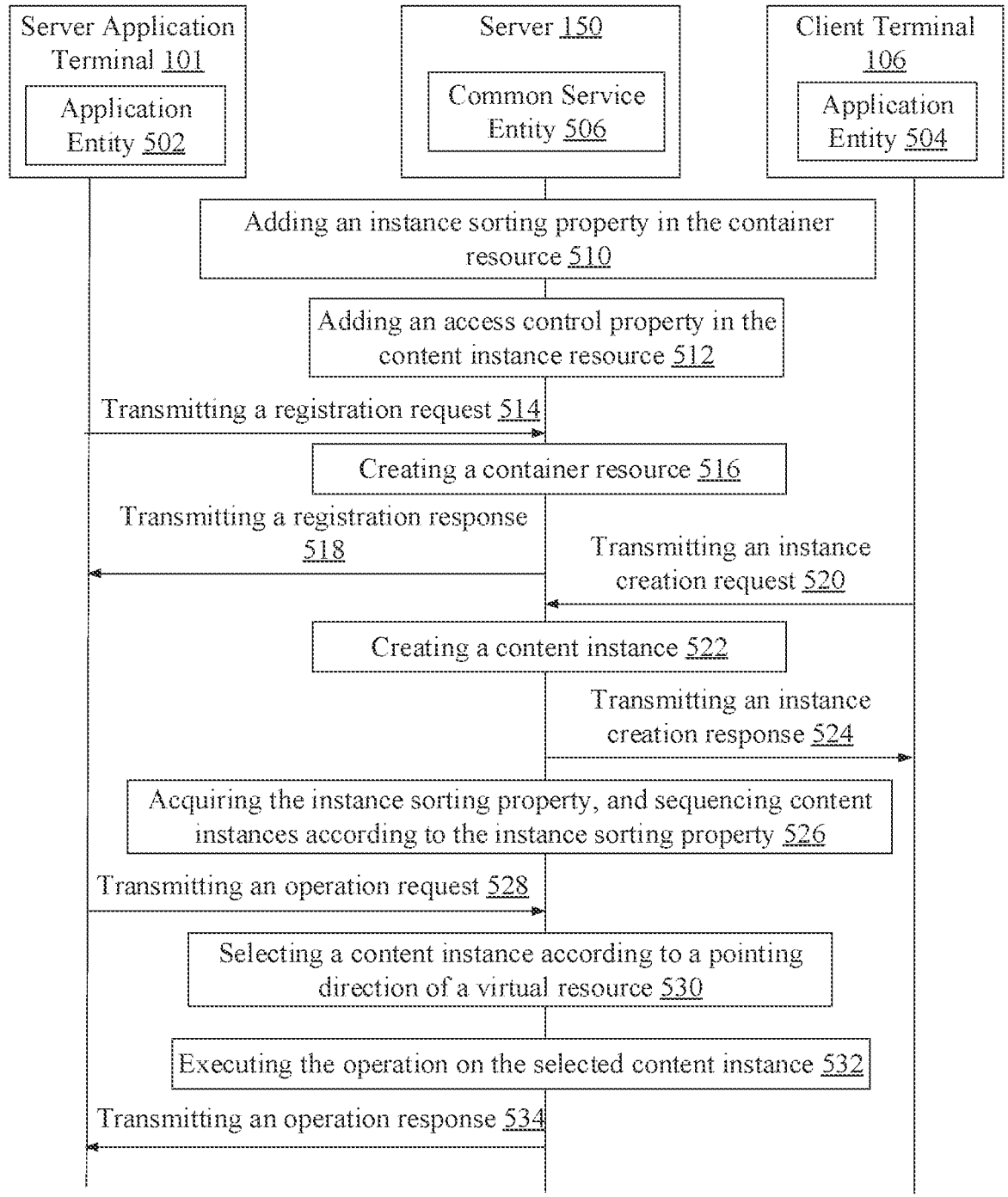
FIG. 5 is a schematic diagram of a process of operating instance resources provided by an embodiment of the present disclosure.
Figure 7:
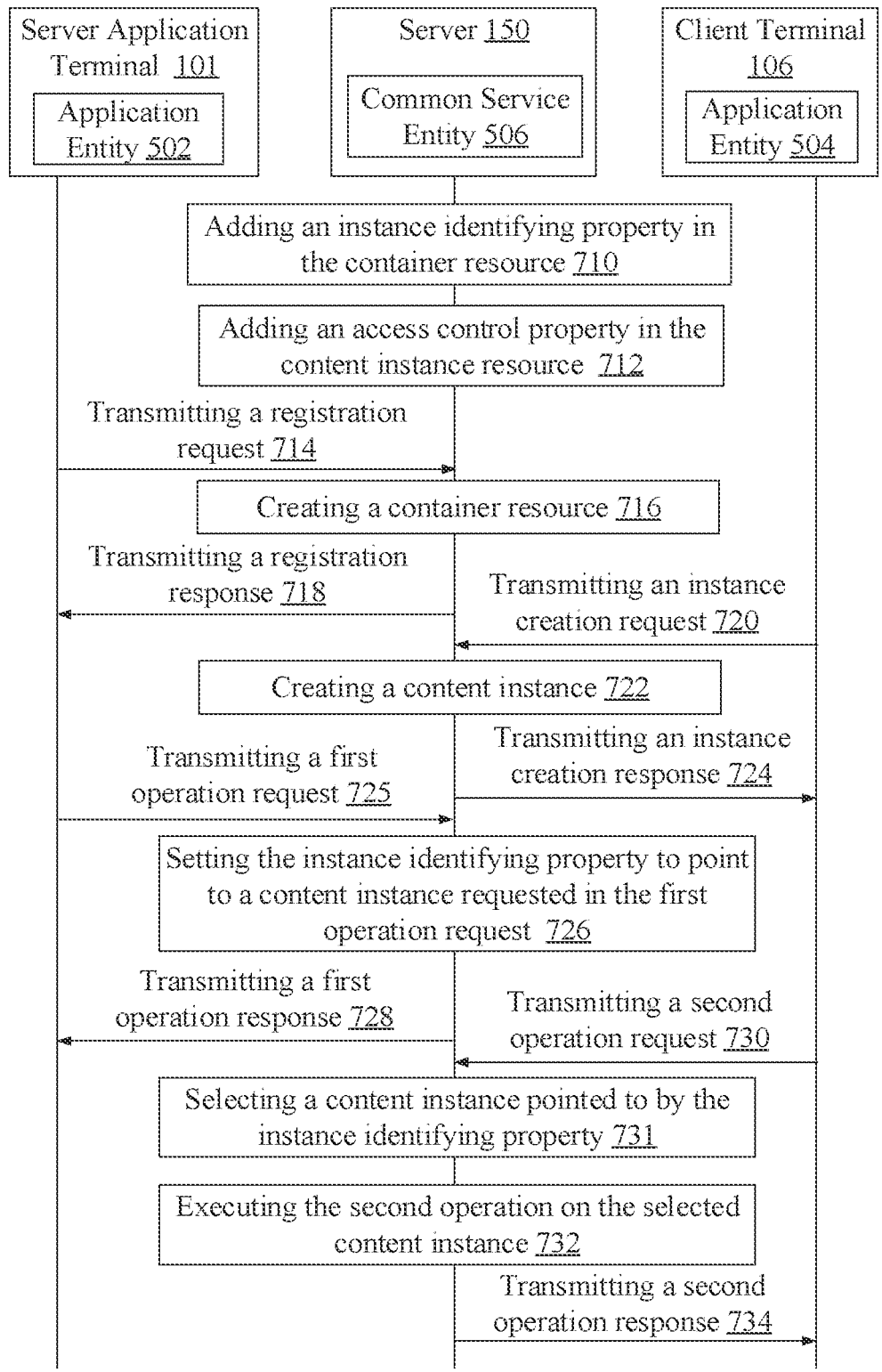
FIG. 7 is a schematic diagram of another process of operating instance resources provided by an embodiment of the present disclosure.

In embodiments provided by the present disclosure, there is established a state tracking mechanism of an instance resource (for example, a content instance, a time series instance and the like) to timely feedback application situations of the instance resource. By establishing the state tracking mechanism of the instance resource, a target instance resource may be quickly accessed, so as to improve efficiency of accessing instance resources and resolve a defect that only a newly created content instance and an earliest created content instance are tracked in existing solutions. For example, as shown in FIG. 5, the content instances may be sequenced according to different instance sorting properties, so as to track states of the content instances under the different instance sorting properties; and alternatively, as shown in FIG. 7, a content instance to be requested (for example, a latest requested content instance, or a certain requested content instance located prior to the latest requested content instance) may be identified by an instance identifying property, so as to track the requested content instance.

In addition, in embodiments of the present disclosure, a protective mechanism of instance resources is enhanced, so that access to respective instance resources is not just limited to access permission of the container resource. In the respective instance resources, access control properties are added, and the access to the respective instance resources has their own access control policies, so that access control of the instance resources is finer and meets requirements of different services.

Hereinafter, the embodiments of the present disclosure will be further described in conjunction with FIG. 2 to FIG. 7.

Figure 2:
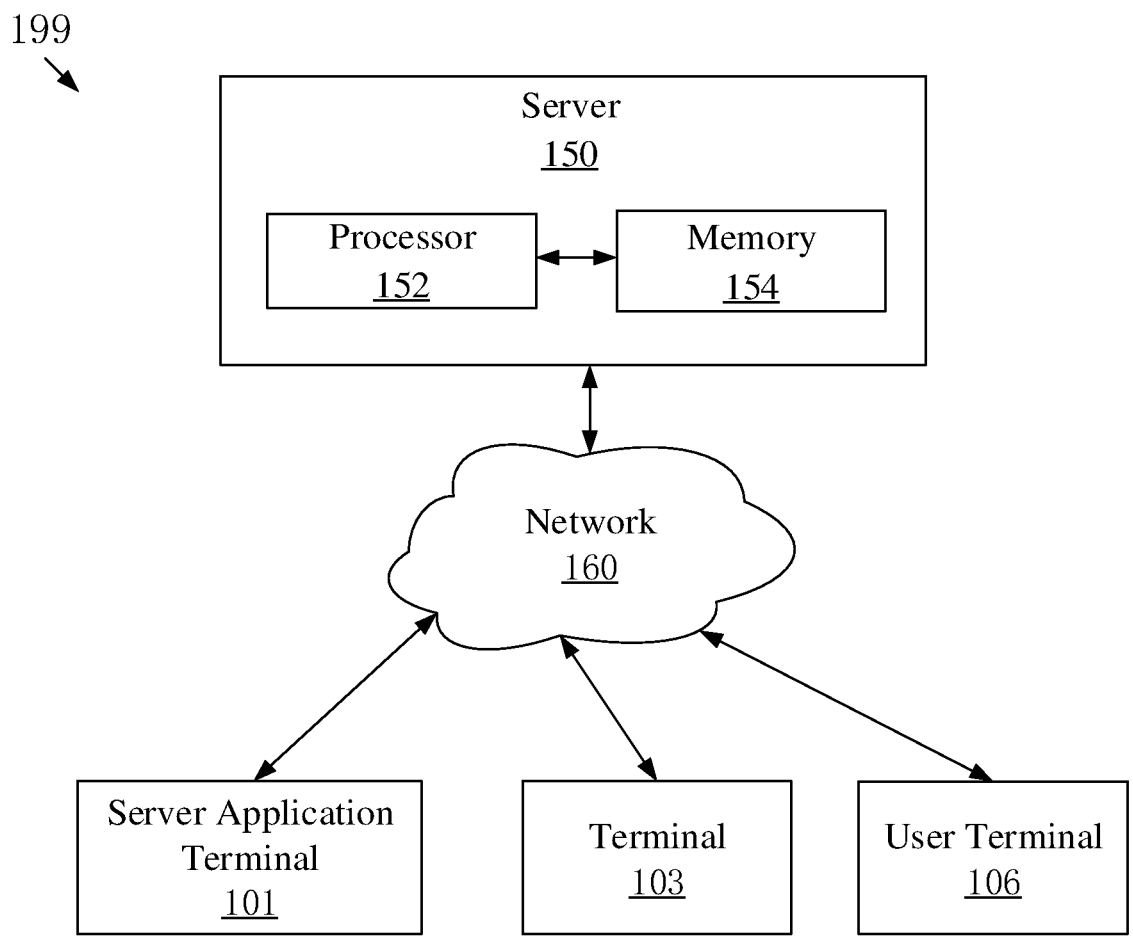
FIG. 2 is a schematic block diagram of a hardware system for operating instance resources provided by an embodiment of the present disclosure.

FIG. 2 is a schematic block diagram of a system 199 including software and hardware for operating instance resources according to an embodiment of the present disclosure. As shown in FIG. 2, the system 199 may include a server application terminal 101, a user terminal 106, another type of terminals 103 and a server 150. Respective devices in the system 199 may be connected with each other through a network 160. The respective devices in the system 199 may communicate with each other directly or indirectly, and for example, the respective devices in the system 199 may transmit and receive data and/or signals to/from each other through the network 160.

The network 160 may be a network capable of realizing interconnection and intercommunication between ordinary objects having independent functions. The network 160 may include a wireless network, and of course, the network 160 may also include a wired network. For example, the network 160 may be an Internet of Things based on an Internet and/or a telecommunication network. Each user can use an electronic tag to connect an ordinary object with the Internet of Things, and therefore, specific locations of the respective ordinary objects may be found out on the Internet of Things. Respective machines and devices may be centralizedly managed and controlled by using a central computer through the Internet of Things. For example, remote control may be performed on machines or devices such as household devices (e.g., a smart refrigerator, a smart microwave oven, etc.), automobiles, mobile terminals and the like, and the locations thereof may be searched.

The server 150 may be a computing device including a processor and a memory. FIG. 2 shows that the server 150 includes a processor 152 and a memory 154.

The processor 152 may process data signals and may include a variety of computing structures such as a Complex Instruction Set Computer (CISC) structure, a Reduced Instruction Set Computer (RISC) structure, or a structure having a combination of a plurality of instruction sets. In some embodiments, the processor 152 may also be a microprocessor, such as an X86 processor or an ARM processor, or may be a Digital Signal Processor (DSP) and the like. The processor 152 may control other components in the server 150 to perform desired functions.

The memory 154 may store instructions and/or data executed by the processor 152. For example, the memory 154 may include one or more computer program products, and the computer program products may include various forms of computer-readable storage media, for example, a volatile memory and/or a non-volatile memory. The volatile memory, for example, may include a Random Access Memory (RAM) and/or a cache and the like. The non-volatile memory, for example, may include a Read Only Memory (ROM), a hard disk, a flash memory and the like. One or more computer program instructions may be stored on the computer-readable storage media, and the processor 152 may execute the program instructions, so as to implement functions described hereinafter and/or other desired functions. A variety of application programs and a variety of data such as various data used and/or generated by the application programs and the like may also be stored in the computer-readable storage media.

The server application terminal 101 may be a computing device including a processor and a memory. For example, the server application terminal 101 may be a desktop computer, a notebook computer, a smartphone, a tablet computer, a game controller, a music player (e.g., a mp3 player) and other terminals including a processor and a memory (e.g., a mobile terminal, a smart terminal). In some embodiments, the server application terminal 101 may include a processor, a memory, and other components such as an input device and an output device and the like. The server application terminal 101 may be operated by staff of a service provider.

The user terminal 106 may be a computing device including a processor and a memory. For example, the user terminal 106 may be a television, a smart household appliance, an electric car, a desktop computer, a notebook computer, a smartphone, a tablet computer and other terminals including a processor and a memory (e.g., a mobile terminal, a smart terminal). In some embodiments, the user terminal 106 may include a processor, a memory and other components such as an input device and an output device. The user terminal 106 may be operated by a user.

The other terminals 103 may have a structure similar to that of the server application terminal 101 or the user terminal 106, and may be operated by other personnel.

The respective terminals 101, 103, and 106 may register with the server 150, and the respective terminals may interact with the server 150 or interact with each other through the server 150.

In some embodiments, the respective devices of the system 199 may further include a display device (e.g., an LCD, an OLED or a projection device), an input device (e.g., a touch device, a keyboard, a microphone, a mouse, etc.), a speaker or a vibrating device and the like according to needs.

Figure 3A:
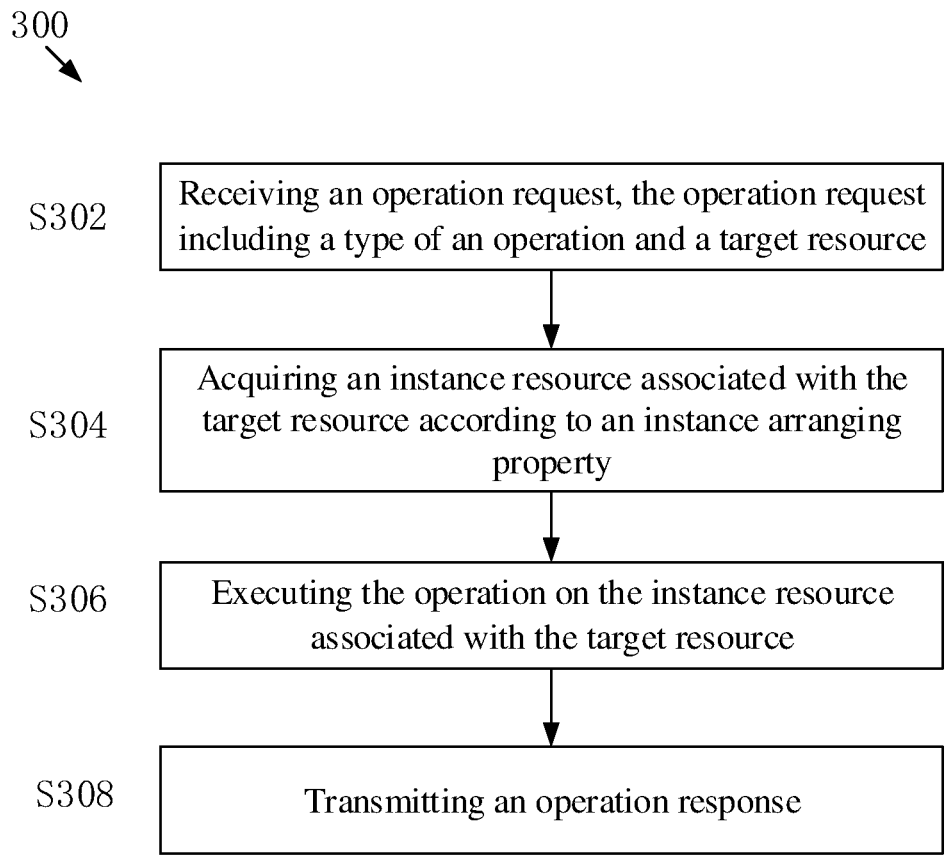
FIG. 3A is a flow chart of a method for operating instance resources provided by an embodiment of the present disclosure.

FIG. 3A is a schematic flow chart of a method 300 for operating instance resources provided by an embodiment of the present disclosure. In some embodiments, the method 300 may comprise some or all of steps shown in FIG. 3A (e.g., some or all of steps S302, S304, S306, and S308). Of course, the method 300 may also comprise other steps which are not shown in FIG. 3A.

Step S302 includes: receiving an operation request, the operation request including a type of an operation and a target resource. For example, the operation request includes an identifier of the operation and an identifier of the target resource. For example, the target resource is a time series resource, a flexContainer resource or a virtual resource. The type of the operations may include creating, acquiring, notifying, deleting and updating and the like. The identifier of the operation is used for identifying the operation, and the identifier of the target resource is used for identifying the target resource.

Step S304 includes: acquiring an instance resource associated with the target resource according to an instance arranging property.

In some embodiments, the operation request includes the instance arranging property. The instance arranging property may be provided by an application entity of a terminal, and transmitted to a common service entity of a server by the operation request. The common service entity sets a resource property thereof according to the instance arranging property acquired from the operation request under the target resource (e.g., a container resource, a flexContainer resource or a time series resource). In some other embodiments, the instance arranging property is directly added under the target resource by the common service entity, so that it does not need to be acquired from the operation request.

The instance arranging property is used for indicating arrangement of the instance resources. In some embodiments, the instance arranging property includes an instance sorting property. For example, the instance sorting property is a parameter under the container resource, which is used for storing or identifying a sequencing rule of instance resources. The sequencing rule includes, but is not limited to: an ascending order of creation times, a descending order of creation times, an ascending order of operation times, a descending order of operation times, an ascending order of resource sizes, a descending order of resource sizes, an ascending order of resource effective periods and a descending order of resource effective periods.

In step S304, the acquiring an instance resource associated with the target resource according to the instance arranging property includes: acquiring an instance resource associated with the target resource according to the instance sorting property. Specifically, the acquiring an instance resource associated with the target resource according to the instance sorting property includes: sequencing instance resources according to the instance sorting property; and acquiring an instance resource associated with the target resource from the sequenced instance resources.

For example, when the target resource is a virtual resource, the step "acquiring an instance resource associated with the target resource from the sequenced instance resources" includes: acquiring an instance resource pointed to by the virtual resource from the sequenced instance resources. For example, when the accessed virtual resource is a latest virtual resource, the latest virtual resource points to a last instance resource after sequencing, and the last instance resource may be selected; when the accessed virtual resource is an oldest virtual resource, the oldest virtual resource points to a first instance resource after sequencing, and the first instance resource may be selected. Certainly, the instance resource pointed to by the virtual resource may also be taken as a reference resource, and an instance resource having an offset $\Delta x$ from the reference resource may be acquired from the sequenced instance resources ($\Delta x$=0, 1, 2, 3 . . . and other integers). For example, when the accessed virtual resource is an oldest virtual resource, the oldest virtual resource points to a first instance resource after sequencing, and if the offset is $\Delta x$=3, then a fourth instance resource after sequencing is selected.

In some embodiments, the instance arranging property includes an instance identifying property, for identifying an instance resource to be requested. The instance identifying property may be used for identifying an instance resource that is newly requested and may also be used for identifying a certain instance resource having been requested prior to the newly-requested instance resource. In step S304, the acquiring an instance resource associated with the target resource according to the instance arranging property includes: acquiring an instance resource pointed to by the instance identifying property as an instance resource associated with the target resource.

For example, when the target resource is a virtual resource, the step S304 "acquiring an instance resource pointed to by the instance identifying property as an instance resource associated with the target resource" includes: acquiring an instance resource pointed to by the instance identifying property, and taking the acquired instance resource as an instance resource pointed to by the virtual resource (for example, acquiring an instance resource pointed to by the instance identifying property, and taking the acquired instance resource as an instance resource pointed to by the latest virtual resource or the oldest virtual resource).

Figure 10:
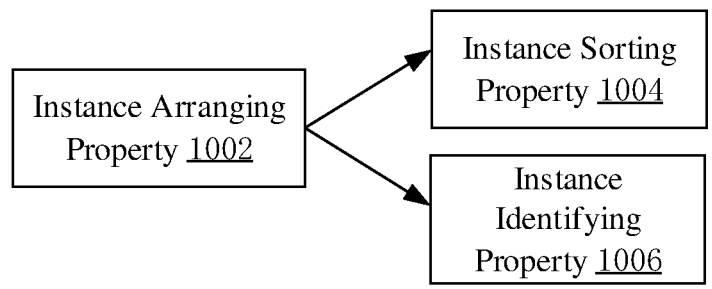
FIG. 10 is a schematic diagram of an instance arranging property provided by an embodiment of the present disclosure.

For example, as shown in FIG. 10, the instance arranging property 1002 includes an instance sorting property 1004 and/or an instance identifying property 1006.

Step S306 includes: executing the operation on the instance resource associated with the target resource. For example, the instance resource associated with the target resource may be created, acquired, updated, deleted or notified.

For example, when the target resource is a virtual resource, step S306 "executing the operation on the instance resource associated with the target resource" includes: executing the operation on the instance resource pointed to by the virtual resource. For example, the instance resource pointed to by the virtual resource may be created, acquired, updated, deleted or notified. Certainly, the instance resource pointed to by the virtual resource may also be taken as a reference resource, and an instance resource having an offset Δx from the reference resource may be selected from the sequenced instance resources for executing the operation. For example, when the accessed virtual resource is a latest virtual resource, the latest virtual resource points to a last instance resource after sequencing, and if the offset is Δx=3, a fourth instance resource counting backwards after sequencing is selected for executing the operation.

Step S308 includes: transmitting an operation response. For example, after the operation is completed, the operation response may be transmitted to a requestor related to the operation request as a response to the operation request.

For example, the instance resource further includes an access control property, and the access control property is used for determining an access control policy of the instance resource. For example, the access control property may be added under the instance resource, and a value of the access control property is an identifier (ID) of an access control policy resource, and is used for identifying a specific access control policy resource. The access control policy resource defines an access control policy of the instance resource. By setting the access control properties, different instance resources may have different access control policies.

Figure 4:
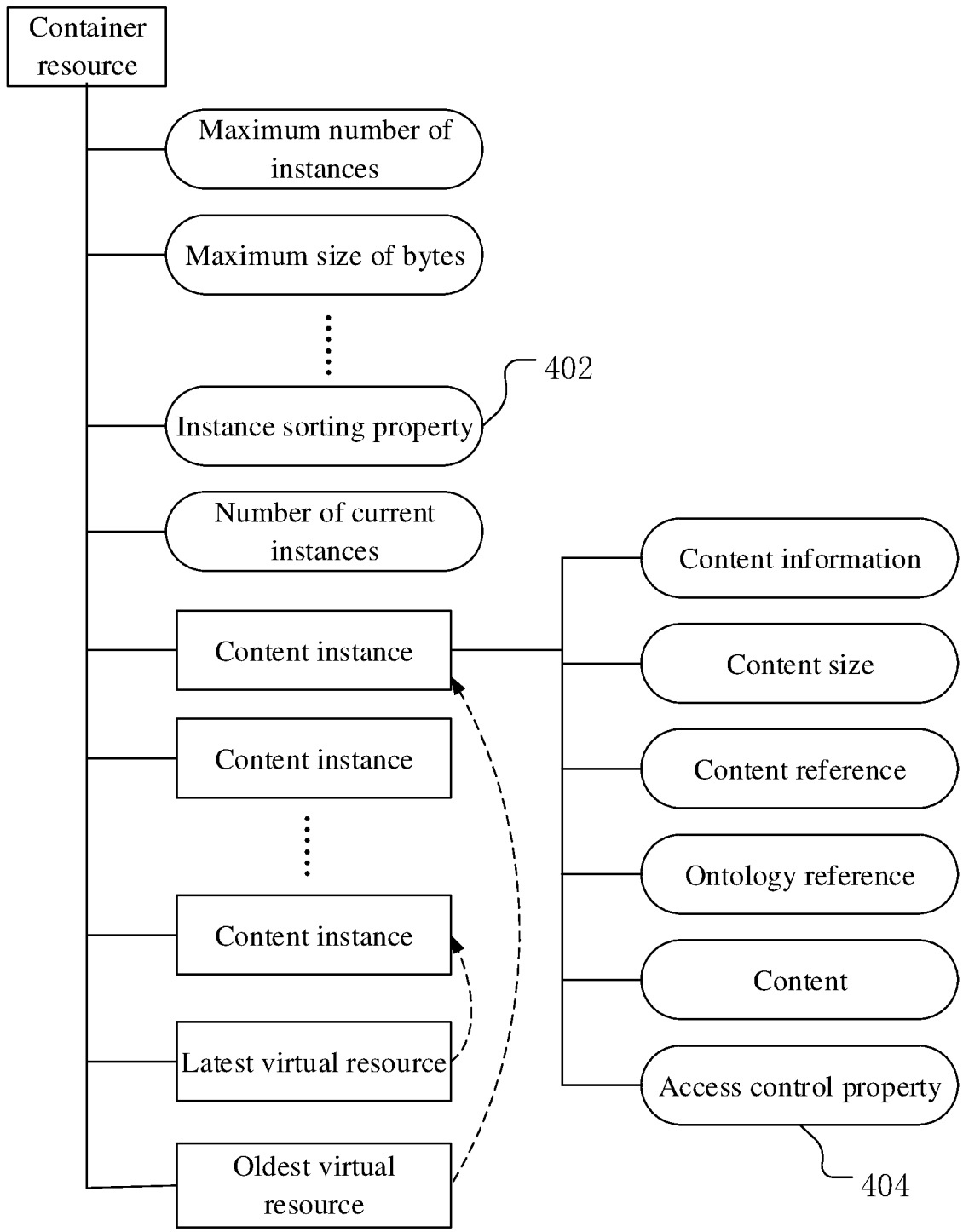
FIG. 4 is a schematic structural diagram of a container resource provided by an embodiment of the present disclosure.
Figure 6:
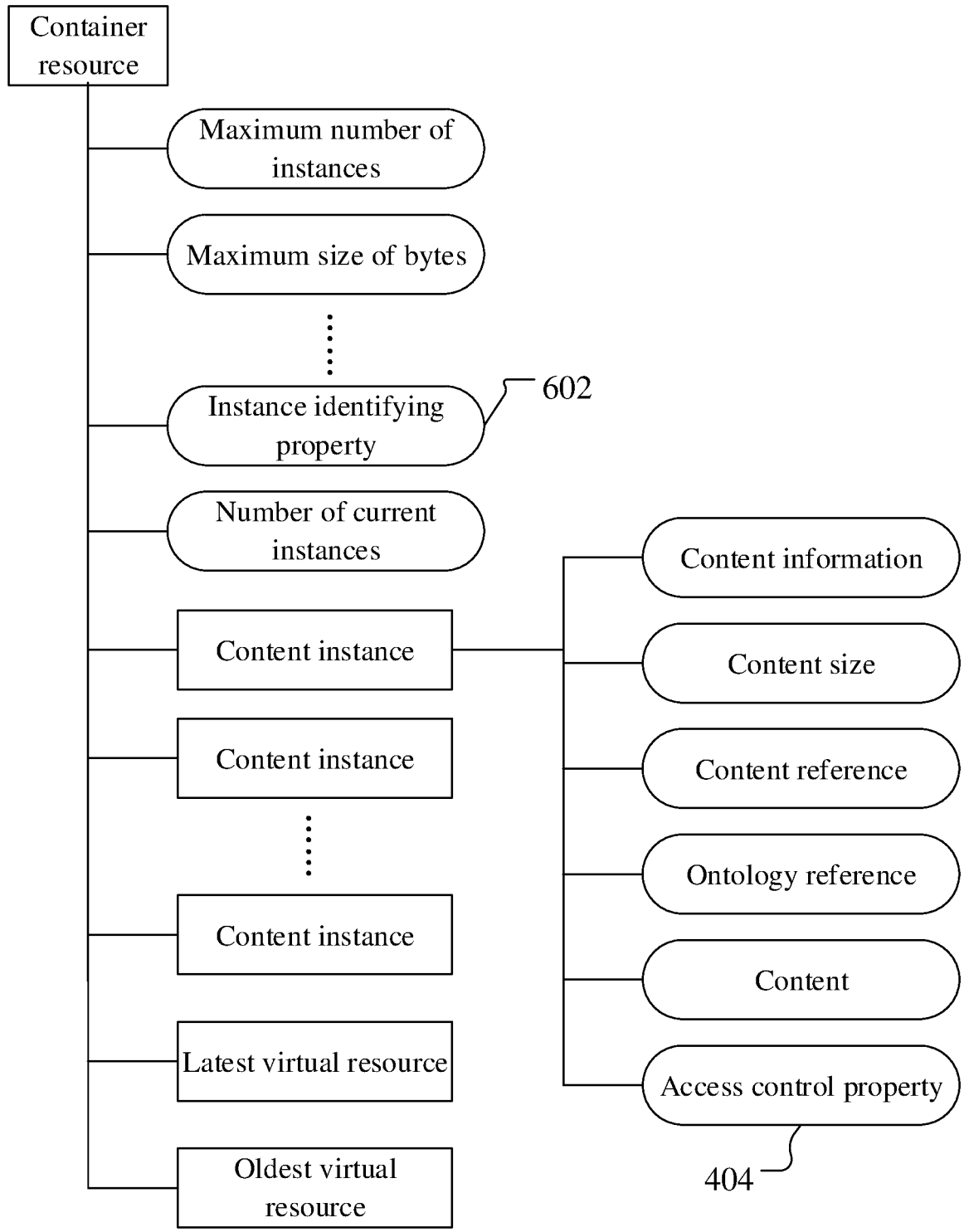
FIG. 6 is a schematic structural diagram of another container resource provided by an embodiment of the present disclosure.

For example, the method 300 may further comprise: creating a target resource, the target resource including the instance arranging property. For example, as shown in FIGS. 4 and 6, a container resource may be created, and the container resource includes an instance arranging property (an instance sorting property 402 and/or an instance identifying property 602); and a content instance may be created under the container resource, and the content instance includes an access control property 404. The instance arranging property may include only one of the instance sorting property 402 and the instance identifying property 602, or include both the instance sorting property 402 and the instance identifying property 602. For another example, a time series resource may be created, and the time series resource includes the instance arranging property; and a time series instance may be created under the time series resource.

Figure 3B:
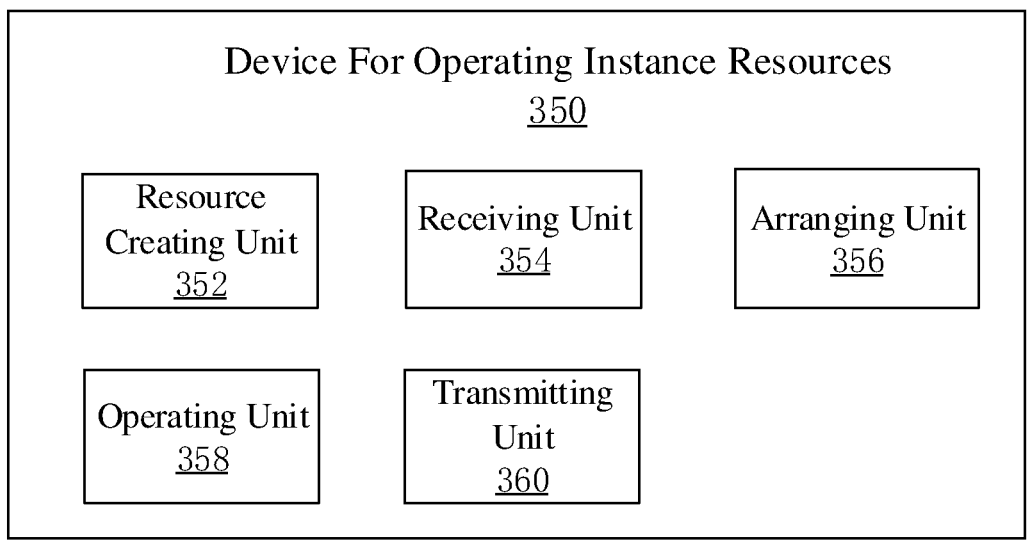
FIG. 3B is a schematic block diagram of a device for operating instance resources provided by an embodiment of the present disclosure.

FIG. 3B is a schematic block diagram of a device 350 for operating instance resources provided by an embodiment of the present disclosure. The device 350 comprises a resource creating unit 352, a receiving unit 354, an arranging unit 356, an operating unit 358, and a transmitting unit 360.

The receiving unit 354 is configured to receive an operation request, the operation request including a type of an operation and a target resource. For example, the operation request includes: an identifier of the operation (for identifying the operation) and an identifier of the target resource (for identifying the target resource, for example, an address of the target resource). The arranging unit 356 is configured to acquire an instance resource associated with the target resource according to the instance arranging property. The operating unit 358 is configured to perform the operation on the instance resource associated with the target resource. The transmitting unit 360 is configured to transmit an operation response.

For example, the target resource is a time series resource, a flexContainer resource or a virtual resource. The operation may include acquiring, deleting, and updating.

For example, the operation request includes the instance arranging property. Alternatively, the instance arranging property may be added under the target resource (e.g., a container resource, a flexContainer resource or a time series resource). For example, the resource creating unit 352 is configured to add the instance arranging property under the target resource before the receiving unit 354 receives the operation request.

For example, the instance arranging property includes an instance sorting property. The arranging unit 356 is configured to: acquire an instance resource associated with the target resource according to the instance sorting property. Specifically, the arranging unit 356 is configured to: sequence instance resources according to the instance sorting property; and acquire an instance resource associated with the target resource from the sequenced instance resources.

For example, when the target resource is a virtual resource, the arranging unit 356 is further configured to: acquire the instance resource pointed to by the virtual resource from the sequenced instance resource; and the operating unit 358 is further configured to: execute the operation on the instance resource pointed to by the virtual resource. Certainly, the instance resource pointed to by the virtual resource may also be taken as a reference resource, and the arranging unit 356 selects an instance resource having an offset Δx from the reference resource from the sequenced instance resources, and then the operating unit 358 executes the operation on the selected instance resource. For example, when the accessed virtual resource is a latest virtual resource, the latest virtual resource points to a last instance resource after sequencing, and if the offset is Δx=3, the arranging unit 356 selects a fourth instance resource counting backwards after sequencing, and the operating unit 358 executes the operation on the selected instance resource.

For another example, the instance arranging property includes an instance identifying property, for identifying an instance resource to be requested. The arranging unit 356 is configured to: acquire an instance resource pointed to by the instance identifying property as an instance resource associated with the target resource. When the target resource is a virtual resource, the arranging unit 356 is configured to: acquire an instance resource pointed to by the instance identifying property as an instance resource pointed to by the virtual resource.

For example, the instance resource includes an access control property, and the access control property is used for determining an access control policy of the instance resource.

The resource creating unit 352 is configured to: create a target resource, the target resource including the instance arranging property. For example, the resource creating unit 352 may be configured to: create a container resource, the container resource including an instance arranging property (an instance sorting property 402 and/or an instance identifying property 602); and create a content instance under the container resource, the content instance including an access control property 404. For another example, the resource creating unit 352 may be configured to create a time series resource, and the time series resource includes an instance arranging property; and create a time series instance under the time series resource, and the time series instance includes an access control property.

In some embodiments of the present disclosure, the device 350 (comprising the resource creating unit 352, the receiving unit 354, the arranging unit 356, the operating unit 358 and the transmitting unit 360) comprises codes and programs stored in the memory; and the processor may execute the codes and the programs to implement some or all of functions of the device 350 described above.

In some embodiments of the present disclosure, the device 350 (comprising the resource creating unit 352, the receiving unit 354, the arranging unit 356, the operating unit 358 and the transmitting unit 360) may be a specialized hardware device for implementing some or all of functions described above. For example, the device 350 ((comprising the resource creating unit 352, the receiving unit 354, the arranging unit 356, the operating unit 358 and the transmitting unit 360) may be a circuit board or a combination of a plurality of circuit boards for implementing the functions described above. In embodiments of the present disclosure, the circuit board or the combination of the plurality of circuit boards may include: (1) one or more processors; (2) one or more non-transitory computer-readable memories connecting with the processors; and (3) a processor-executable firmware stored in the memory. For another example, the device 350 (comprising the resource creating unit 352, the receiving unit 354, the arranging unit 356, the operating unit 358 and the transmitting unit 360) may be implemented by using ASIC, FPGA or other programmable logic devices.

FIG. 4 is a schematic structural diagram of a container resource provided by an embodiment of the present disclosure. As compared with FIG. 1, a container resource in FIG. 4 includes an instance sorting property 402, and each content instance includes an access control property 404. After the content instances are sequenced according to the instance sorting property 402, a latest virtual resource <latest> may point to a last content instance after sequencing, and an oldest virtual resource <oldest> may point to a first content instance after sequencing.

FIG. 5 is a schematic diagram of a process of operating instance resources according to an embodiment of the present disclosure. An application entity 502 is located at a server application terminal 101, an application entity 504 is located at a client terminal 106, and a common service entity 506 is located at a server 150. The device 350 for operating instance resources shown in FIG. 3B may be part of the common service entity 506. It should be noted that a container resource and a content instance resource are taken as an example in description for FIG. 4 to FIG. 8. Similar methods and operations may also be applied to a flexContainer resource and a time series resource, which will not be repeated here.

First, the device 350 adds an instance sorting property in the container resource (step 510), and adds an access control property in a content instance resource (step 512). The application entity 502 transmits a registration request to the server 150 (step 514). In response to the registration request, the server application terminal 101 may be registered, and the device 350 creates a corresponding container resource (step 516). The device 350 transmits a registration response to the server application terminal 101 (step 518).

The application entity 504 transmits an instance creation request to the server 150 (step 520). In response to the instance creation request, the device 350 creates a content instance (step 522), and transmits an instance creation response to the application entity 504 (step 524). The device 350 may receive a plurality of instance creation requests from a plurality of client terminals 106, and create a plurality of content instances correspondingly.

The device 350 acquires an instance sorting property, and sequences the content instances according to the instance sorting property (step 526). For example, if the instance sorting property is an ascending order of resource effective periods, the device 350 may sequence the content instances in the ascending order according to lengths of effective periods of the content instances.

The application entity 502 transmits an operation request to the server 150 (step 528). The operation request includes a type of an operation and a virtual resource. The device 350 selects a content instance according to a pointing direction of the virtual resource (step 530), and executes the operation on the selected content instance (step 532). For example, the device 350 selects a content instance pointed to by the virtual resource from the sequenced content instances, and executes the operation on the content instance pointed to by the virtual resource. Of course, the device 350 may also take the content instance pointed to by the virtual resource as a reference resource, and select a content instance having an offset Δx from the reference resource from the sequenced content instances, and then execute the operation on the selected content instance. After the operation has been completed, the device 350 transmits an operation response to the application entity 402 (step 534).

For example, the server 150 creates different content instances for different client terminals 106, and the server 150 may sequence priorities of the content instances according to the instance sorting property, and then the server application terminal 101 may acquire a content instance having a higher priority to process in advance according to the sequenced content instances.

An example of energy management is described in conjunction with FIG. 5. For example, a user subscribes an energy management service from the server 150 via the user terminal 106 for managing energy consumption (e.g., power consumption) at home. In this case, the common service entity 506 may include an energy management platform. Household appliances (e.g., a smart air conditioner and a smart refrigerator) in the user's home are all intelligent terminals which can register with the energy management platform in the server, and a purpose of the registration is to allow the user terminal to control and manage the household appliances through the energy management platform. After the household appliances have registered with the server 150, the user may send an instance creation request (e.g., a request for subscribing the energy management service) to the server via the user terminal 106. In response to the instance creation request, the server creates a content instance for each household appliance (e.g., a refrigerator energy consumption instance, an air conditioning energy consumption instance and the like); each content instance is used for recording energy consumption of a corresponding appliance (e.g., power consumption, a time period of power consumption, an amount of money to be paid, etc.); after the content instances have been created, the server 150 transmits an instance creation response to the user terminal, indicating that the respective content instances have been successfully created. The server 150 may sequence the respective content instances according to an instance sorting property (e.g., the instance sorting property indicates sequencing in an order from the oldest creation time to the newest creation time). Afterwards, a home appliance (e.g., a smart refrigerator) having a content instance of a latest creation time may transmit an operation request of "update" to the server 150, so as to update its energy consumption. At this point, a virtual resource points to a refrigerator energy consumption instance having the latest creation time, and the server may acquire the refrigerator energy consumption instance according to the pointing direction of the virtual resource, and update the energy consumption of the refrigerator. After the update has been completed, the server 150 transmits a response corresponding to the "update" operation to the smart refrigerator.

FIG. 6 is a schematic structural diagram of another container resource provided by an embodiment of the present disclosure. As compared with FIG. 1, a container resource in FIG. 6 includes an instance identifying property 602, and each content instance includes an access control property 404. After the instance identifying property 602 is set to point to a content instance to be requested, the requested content instance may be accessed through the instance identifying property 602.

FIG. 7 is a schematic diagram of another process of operating instance resources according to an embodiment of the present disclosure. A device 350 in a common service entity 506 adds an instance identifying property in a container resource (step 710), and adds an access control property in a content instance resource (step 712). An application entity 502 transmits a registration request to a server 150 (step 714). In response to the registration request, a server application terminal 101 may be registered, and the device 350 creates a corresponding container resource (step 716). The device 350 transmits a registration response to the server application terminal 101 (step 718).

An application entity 504 transmits an instance creation request to the server 150 (step 720). In response to the instance creation request, the device 350 creates a content instance (step 722), and transmits an instance creation response to the application entity 504 (step 724). The device 350 may receive a plurality of instance creation requests from a plurality of client terminals 106, and create a plurality of content instances correspondingly.

The application entity 502 transmits a first operation request to the server 150 (step 725). The first operation request includes a type of a first operation and a first virtual resource. The device 350 selects a content instance according to a pointing direction of the first virtual resource, and executes the first operation on the selected content instance. The device 350 sets an instance identifying property to point to the content instance requested in the first operation request (step 726). That is, the instance identifying property is used for pointing to the content instance requested latest by the application entity 502 of the server application terminal. The device 350 transmits a first operation response to the server application terminal 101 (step 728).

An application entity 504 of a client terminal 106 transmits a second operation request to the server 150 (step 730). The second operation request includes a type of a second operation and a second virtual resource. The device 350 selects the content instance pointed to by the instance identifying property as a content instance pointed to by the second virtual resource (step 731), and executes the second operation on the selected content instance (step 732). The device 350 transmits a second operation response to the client terminal 106 (step 734).

For example, both the first operation request and the second operation request are acquisition requests, and the server application terminal 101 acquires a content instance from the server 150 through the first operation request, and the instance identifying property is set to point to the acquired content instance; afterwards, the client terminal 106 interacts with the server 150 through the second operation request and the instance identifying property, so as to acquire the content instance acquired by the server application terminal 101.

Figure 8:
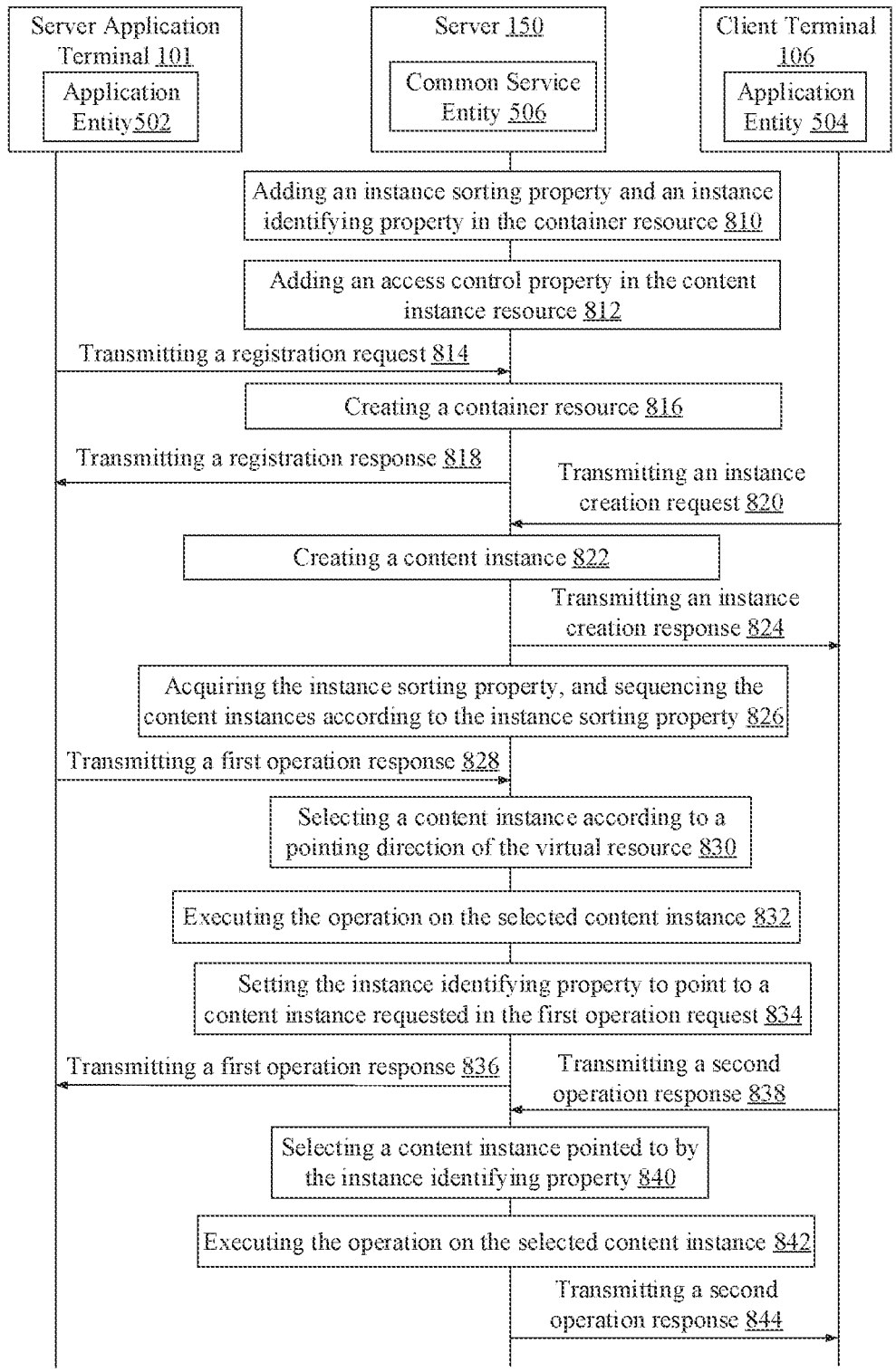
FIG. 8 is a schematic diagram of still another process of operating instance resources provided by an embodiment of the present disclosure.

FIG. 8 is a schematic diagram of still another process of operating instance resources according to an embodiment of the present disclosure. A device 350 adds an instance sorting property and an instance identifying property in a container resource (step 810), and adds an access control property in a content instance resource (step 812). An application entity 502 transmits a registration request to a server 150 (step 814). In response to the registration request, a server application terminal 101 may be registered, and the device 350 creates a corresponding container resource (step 816). The device 350 transmits a registration response to the server application terminal 101 (step 818).

An application entity 504 transmits an instance creation request to the server 150 (step 820). In response to the instance creation request, the device 350 creates a content instance (step 822), and transmits an instance creation response to the application entity 504 (step 824). The device 350 may receive a plurality of instance creation requests from a plurality of client terminals 106, and create a plurality of content instances correspondingly. The device 350 acquires the instance sorting property, and sequences the content instances according to the instance sorting property (step 826).

The application entity 502 transmits a first operation request to the server 150 (step 828). The first operation request includes a type of a first operation and a first virtual resource. The device 350 selects a content instance according to a pointing direction of the first virtual resource, and executes the first operation on the selected content instance (step 832). The device 350 sets the instance identifying property to point to the content instance requested in the first operation request (step 834). For example, the first virtual resource is an oldest virtual resource, and the device 350 selects a content instance located in a first location after sequencing for executing the first operation according to the oldest virtual resource, and then sets the instance identifying property to point to the content instance located in the first location after sequencing. After the first operation has been completed, the device 350 transmits a first operation response to the application entity 402 (step 836).

The application entity 504 transmits a second operation request to the server 150 (step 838). The second operation request includes a type of a second operation and a second virtual resource. The device 350 selects the content instance pointed to by the instance identifying property as a content instance pointed to by the second virtual resource (step 840), and executes the second operation on the selected content instance (step 842). The device 350 transmits a second operation response to the client terminal 106 (step 844).

Figure 9A:
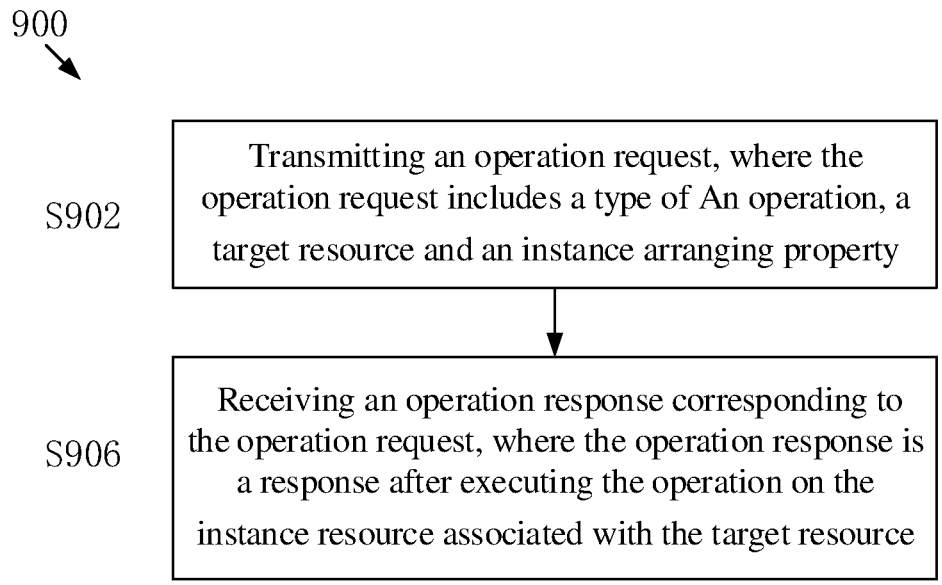
FIG. 9A is a flow chart of a method for requesting operations on an instance resource provided by an embodiment of the present disclosure.

FIG. 9A is a flow chart of a method 900 for requesting an operation on an instance resource provided by an embodiment of the present disclosure. The method 900 may be performed in a terminal. The method 900 comprises:

Step S902: transmitting an operation request, where the operation request includes a type of an operation, a target resource and an instance arranging property; and Step S906: receiving an operation response, where the operation response is a response after executing the operation on the instance resource associated with the target resource.

For example, the instance arranging property includes at least one of an instance sorting property and an instance identifying property. In conjunction with FIG. 3A to FIG. 8, an instance resource associated with the target resource may be acquired according to the instance arranging property, which will not be repeated here.

Figure 9B:
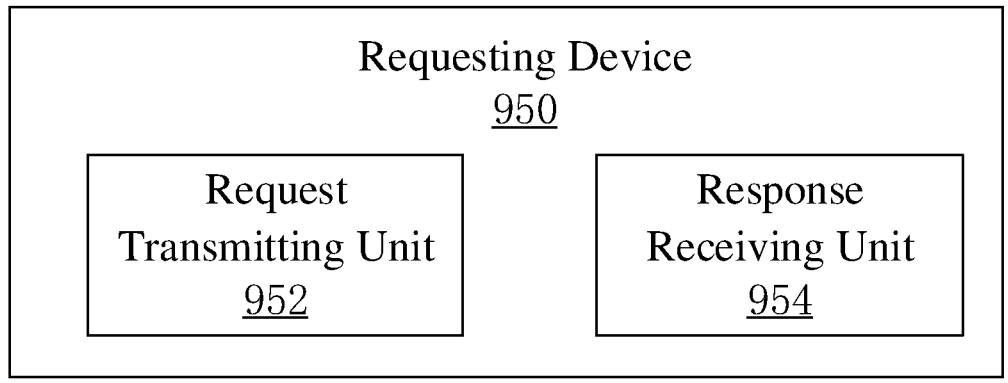
FIG. 9B is a schematic block diagram of a requesting device provided by an embodiment of the present disclosure.

FIG. 9B is a schematic block diagram of a requesting device 950 provided by an embodiment of the present disclosure. The requesting device 950 may be a part of an application entity of a terminal. The requesting device 950 is used for requesting to perform an operation on an instance resource, and comprises: a request transmitting unit 952, configured to transmit an operation request, where the operation request includes a type of an operation, a target resource and an instance arranging property; and a response receiving unit 954, configured to receive an operation response, where the operation response is a response after executing the operation on the instance resource associated with the target resource.

For example, the instance arranging property includes at least one of an instance sorting property and an instance identifying property. In conjunction with FIG. 3A to FIG. 8, an instance resource associated with the target resource may be acquired according to the instance arranging property.

In some embodiments of the present disclosure, the requesting device 950 (comprising the request transmitting unit 952 and the response receiving unit 954) comprises codes and programs stored in a memory; a processor may execute the codes and programs to implement some or all of functions of the device 950 described above.

In some embodiments of the present disclosure, the device 950 (comprising the request transmitting unit 952 and the response receiving unit 954) may be a specialized hardware device for implementing some or all of functions described above. For example, the device 950 (comprising the request transmitting unit 952 and the response receiving unit 954) may be a circuit board or a combination of a plurality of circuit boards for implementing the functions described above. In embodiments of the present disclosure, the circuit board or the combination of the plurality of circuit boards may include: (1) one or more processors; (2) one or more non-transitory computer-readable memories connecting with the processors; and (3) a processor-executable firmware stored in the memories. For another example, the device 950 (comprising the request transmitting unit 952 and the response receiving unit 954) may be implemented by using ASIC, FPGA or other programmable logic devices.

In the embodiments provided by the present disclosure, there is established a state tracking mechanism for instance resources to timely feedback application situations of the instance resources. By establishing the state tracking mechanism for the instance resources, a target instance resource may be quickly accessed, so as to improve efficiency of accessing the instance resources and resolve a defect that only a newly created content instance and an earliest created content instance are tracked in existing solutions. In addition, in embodiments of the present disclosure, a protective mechanism of instance resources is enhanced, so that access to respective instance resources is not just limited to access permission of the container resources. In the respective instance resources, access control properties are added, and the access to the respective instance resources has their own access control policies, so that access control of the instance resources is finer and meets requirements of different services.

In the present disclosure, terms such as "first", "second" and the like used in the present disclosure do not indicate any sequence, quantity or significance but only for distinguishing different constituent parts. Also, the terms such as "a," "an," or "the" etc., are not intended to limit the amount, but indicate the existence of at least one. The terms "comprises," "comprising," "includes," "including," etc., are intended to specify that the elements or the objects stated before these terms and encompass the elements or the objects and equivalents thereof listed after these terms, but do not preclude the other elements or objects.

Obviously, those skilled in the art may modify the disclosure in various ways without breaking away from the spirits and scope of the disclosure. And so, if these changes and variations of the disclosure also fall within the scope of the claims or their equivalent technologies, the disclosure intends to include these changes and variations.

What are described above is related to the illustrative embodiments of the disclosure only and not limitative to the scope of the disclosure; any changes or replacements easily for those technical personnel who are familiar with this technology in the field to envisage in the scopes of the disclosure, should be in the scope of protection of the present disclosure. Therefore, the scopes of the disclosure are defined by the accompanying claims.

The present application claims the priority of the Chinese Patent Application No. 201710026213.5 filed on Jan. 13, 2017, which is incorporated herein by reference in its entirety as part of the disclosure of the present application.

The invention claimed is:

1. A method for operating instance resources, comprising:
adding an instance arranging property in a target resource;
receiving an operation request, the operation request comprising a type of an operation and the target resource;
acquiring an instance resource associated with the target resource according to the instance arranging property;
executing the operation on the instance resource associated with the target resource; and
transmitting an operation response,
wherein the target resource comprises a time series resource, a container resource, a flexContainer resource or a virtual resource;
the instance arranging property comprises an instance sorting property, and the instance sorting property is used for storing or identifying a sequencing rule of instance resources; and
the acquiring the instance resource associated with the target resource according to the instance arranging property, comprises: sequencing instance resources according to the instance sorting property, and acquiring the instance resource associated with the target resource from the sequenced instance resources, wherein the instance sorting property is directly added under the target resource and is in a different hierarchy level from the target resource, and the instance sorting property and the instance resources are provided in an identical hierarchy level under the target resource and are separated from each other in the identical hierarchy level.

2. The method according to claim 1, wherein when the target resource is a virtual resource:
the acquiring the instance resource associated with the target resource from the sequenced instance resources includes: acquiring an instance resource pointed to by the virtual resource from the sequenced instance resources; and
the executing the operation on the instance resource associated with the target resource, includes: executing the operation on the instance resource pointed to by the virtual resource.

3. The method according to claim 1, wherein:
the instance arranging property includes an instance identifying property for identifying an instance resource to be requested; and
the acquiring the instance resource associated with the target resource according to the instance arranging property, includes: acquiring an instance resource pointed to by the instance identifying property as the instance resource associated with the target resource.

4. The method according to claim 3, wherein when the target resource is a virtual resource:
the acquiring the instance resource pointed to by the instance identifying property as the instance resource associated with the target resource, includes: acquiring the instance resource pointed to by the instance identifying property as an instance resource pointed to by the virtual resource.

5. The method according to claim 1, wherein the instance resource includes an access control property, the access control property being used for determining an access control policy of the instance resource.

6. The method according to claim 1, wherein the operation includes creating, acquiring, deleting, notifying and updating.

7. The method according to claim 1, further comprising:
creating the target resource, the target resource including the instance arranging property.

8. The method according to claim 1, wherein the sequencing rule comprises an ascending order of resource effective periods, a descending order of resource effective periods, an ascending order of operation times, or a descending order of operation times.

9. The method according to claim 1, wherein the instance arranging property is directly added under the target resource prior to any operation request being received.

10. The method according to claim 1, wherein adding the instance arranging property directly under the target resource is independent from any received operation request.

11. A device for operating instance resources, comprising:
at least one processor; and
at least one memory communicatively coupled to the at least one processor and storing instructions that upon execution by the at least one processor cause the device to:
receive an operation request, the operation request including a type of an operation and a target resource;
acquire an instance resource associated with the target resource according to an instance arranging property;
execute the operation on the instance resource associated with the target resource;
add the instance arranging property in the target resource before receiving the operation request; and
transmit an operation response,
wherein the target resource comprises a time series resource, a container resource, a flexContainer resource or a virtual resource;
the instance arranging property comprises an instance sorting property, and the instance sorting property is used for storing or identifying a sequencing rule of instance resources;
the instance resources are sequenced according to the instance sorting property, and the instance resource associated with the target resource is acquired from the sequenced instance resources; and
the instance sorting property is directly added under the target resource and is in a different hierarchy level from the target resource, and the instance sorting property and the instance resources are provided in an identical hierarchy level under the target resource and are separated from each other in the identical hierarchy level.

12. The device according to claim 11, wherein when the target resource is a virtual resource:
an instance resource pointed to by the virtual resource is acquired from the sequenced instance resources; and
the operation is executed on the instance resource pointed to by the virtual resource.

13. The device according to claim 11, wherein:
the instance arranging property includes an instance identifying property, configured for identifying an instance resource to be requested;
an instance resource pointed to by the instance identifying property is acquired as the instance resource associated with the target resource; and
when the target resource is a virtual resource, the instance resource pointed to by the instance identifying property is acquired as an instance resource pointed to by the virtual resource.

14. The device according to claim 11, wherein the instance resource includes an access control property, and the access control property is configured for determining an access control policy of the instance resource.

15. A method of requesting an operation on an instance resource, comprising:
adding an instance arranging property in a target resource;
transmitting an operation request, wherein the operation request comprises a type of an operation, the target resource and the instance arranging property, the target resource comprises a time series resource, a container resource, a flexContainer resource or a virtual resource, the instance arranging property comprises an instance sorting property, and the instance sorting property is used for storing or identifying a sequencing rule of instance resources; and
receiving an operation response, wherein the operation response is a response after executing the operation on an instance resource associated with the target resource, instance resources are sequenced according to the instance sorting property, the instance resource associated with the target resource is acquired from the sequenced instance resources, the instance sorting property is directly added under the target resource and is in a different hierarchy level from the target resource, and the instance sorting property and the instance resources are provided in an identical hierarchy level under the target resource and are separated from each other in the identical hierarchy level.

\* \* \* \* \*